(12) United States Patent
King et al.

(10) Patent No.: US 9,491,624 B2
(45) Date of Patent: Nov. 8, 2016

(54) PUBLIC KEY CRYPTOGRAPHY FOR APPLICATIONS REQUIRING GENERIC BOOTSTRAP ARCHITECTURE

(75) Inventors: William C. King, Lafayette, CA (US); Bjorn Hjelm, Livermore, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1369 days.

(21) Appl. No.: 13/315,551

(22) Filed: Dec. 9, 2011

(65) Prior Publication Data
US 2013/0149996 A1  Jun. 13, 2013

(51) Int. Cl.
*H04W 12/08*  (2009.01)

(52) U.S. Cl.
CPC .................. *H04W 12/08* (2013.01)

(58) Field of Classification Search
CPC .................................................. H04W 12/08
See application file for complete search history.

(56) References Cited

U.S. PATENT DOCUMENTS

| | | | |
|---|---|---|---|
| 2002/0099878 A1* | 7/2002 | Henrie et al. | 710/14 |
| 2005/0127188 A1* | 6/2005 | Mahalal | 235/492 |
| 2006/0218396 A1* | 9/2006 | Laitinen et al. | 713/167 |
| 2011/0237250 A1* | 9/2011 | Horn et al. | 455/433 |

OTHER PUBLICATIONS

RSA Laboratories, "PKCS #15 v1.1: Cryptographic Token Information Syntax Standard," Jun. 6, 2000, 81 pages.
RSA Laboratories, "PKCS #15: An ICC File Structure Standard," Version 1.0, Sep. 18, 1998, 17 pages.
3GPP TS 33.220 V9.3.0 (Jun. 2010), "$3^{rd}$ Generation Partnership Project; Technical Specification Group Services and System Aspects; Generic Authentication Architecture (GAA); Generic bootstrapping architecture (Release 9)," 75 pages.
3GPP TS 33.110 V7.0.0 (Dec. 2006), "$3^{rd}$ Generation Partnership Project; Technical Specification Group Services and System Aspects; Key establishment between a Universal Integrated Circuit Card (UICC) and a terminal (Release 7)," 14 pages.
Bains, "Ex Committee EVote: NFC Handset APIs Requirements Specification White Paper," GSMA, The GSM Association, DAG & EMC Ex Committee Email Approval, Jul. 18, 2011, 45 pages.
GlobalPlatform Inc., "Secure Element Control Access," GlobalPlatform Device Technology, Version 0.4, Oct. 2011, 47 pages.

* cited by examiner

*Primary Examiner* — Christopher M Brandt

(57) ABSTRACT

A mobile terminal is configured to store information associated with accessing an application that requires bootstrapping; recognize an invocation of the application; identify a rule, included in the information, associated with accessing the application; determine whether the rule indicates that a user of the mobile terminal is allowed to access the application; determine whether the mobile terminal supports the bootstrapping; and provide access to the application when the rule indicates that the user of the mobile terminal is allowed to access the application and when the mobile terminal supports the bootstrapping.

20 Claims, 8 Drawing Sheets

PUBLIC KEY CRYPTOGRAPHY FOR APPLICATIONS REQUIRING GENERIC BOOTSTRAP ARCHITECTURE

BACKGROUND

Mobile terminals may use smart cards, such as Universal Integrated Circuit Cards (UICCs) to access various types of networks. The smart cards may provide services that ensure the integrity and security of personal data.

Generic bootstrapping architecture (GBA) is a standard defined by the Third Generation Partnership Project (3GPP) for authentication of a user of a mobile terminal. GBA relies on a shared secret key between the mobile terminal and an application server. The mobile terminal and the application server are mutually authenticated through an intermediary server, referred to as a bootstrapping server function (BSF), that arranges a security relation between the mobile terminal and the application server. Under GBA, the authentication of the mobile terminal and the server are based on the assumption that the mobile terminal is trusted. This can potentially lead to security vulnerabilities at the mobile terminal or in the interface between the mobile terminal and the smart card.

DETAILED DESCRIPTION OF PREFERRED EMBODIMENTS

The following detailed description refers to the accompanying drawings. The same reference numbers in different drawings may identify the same or similar elements.

Systems and/or methods, described herein, may use a PKCS #15 file structure for applications requiring GBA. In one implementation, information from a PKCS #15 file may be stored in a smart card and/or a storage device of a mobile terminal. The information may specify which applications, requiring GBA, may be accessed via the mobile terminal, and may include rules for accessing the applications. For example, the mobile terminal may recognize an invocation of an application that requires GBA. The mobile terminal may transmit a request to access the application. A BSF, of a carrier of the mobile terminal, may provide authorization for the mobile terminal to determine whether a user can access the application after the BSF determines that the mobile terminal can handle GBA. The mobile terminal may receive the authorization, and may provide or deny access to the application based on the information included in the PKCS #15 file. As a result, the carrier can ensure that unauthorized users cannot access applications that require GBA via the mobile terminal.

A carrier may refer to one or more of a mobile network operator (MNO), a mobile telephone operator, a carrier service provider (CSP), a wireless service provider, a wireless carrier, a cellular company, and/or any other company that provides mobile telephone service(s) to users (e.g., subscribers of the carrier) via a network. A carrier network may refer to a communications network provided and operated by the carrier.

As used herein, the terms "subscriber" and/or "user" may be used interchangeably. Also, the terms "subscriber" and/or "user" are intended to be broadly interpreted to include a mobile terminal (e.g., a mobile communication device) or a user of a mobile terminal.

Figure 1:
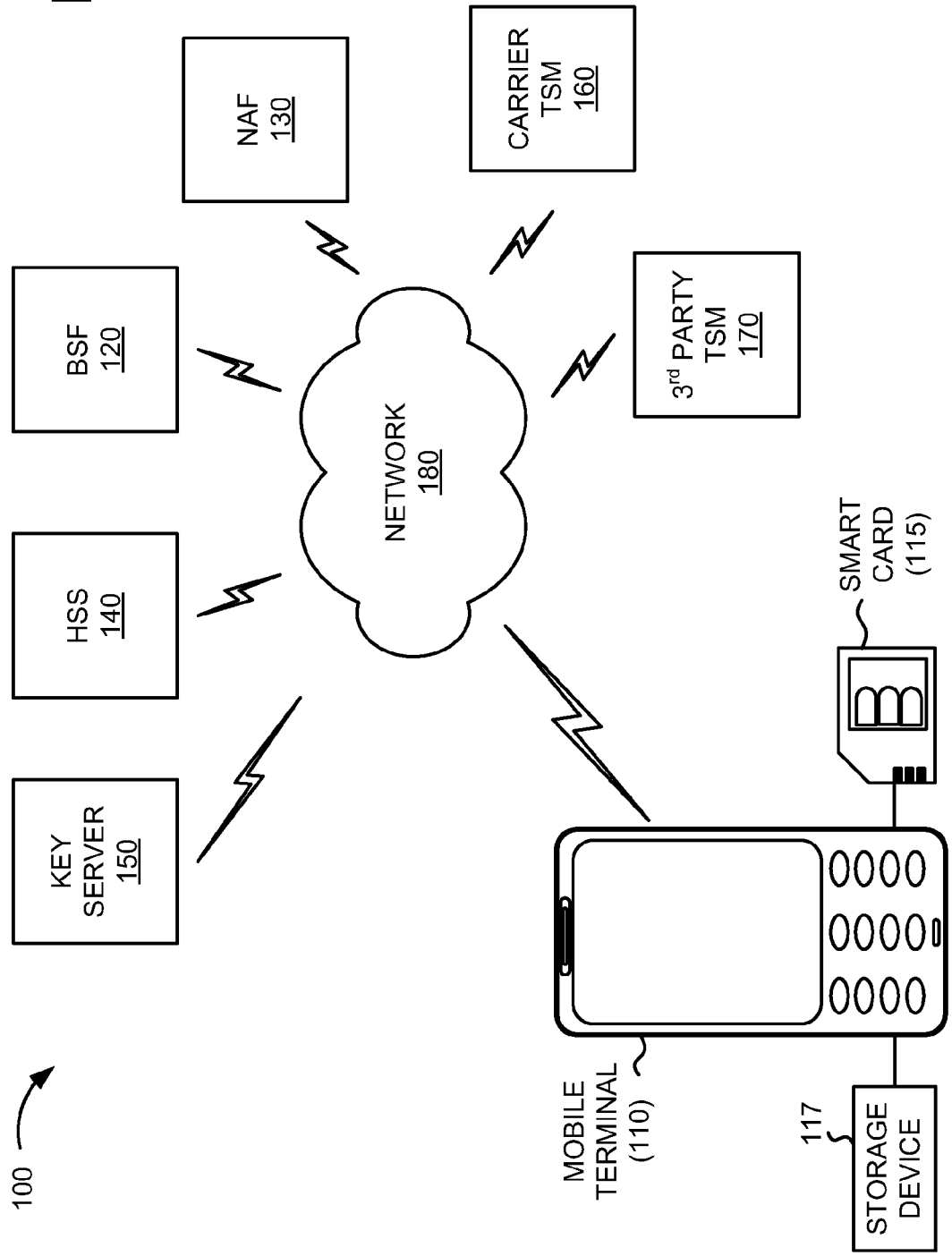
FIG. 1 is a diagram of an example environment in which systems and/or methods described herein may be implemented.

FIG. 1 is a diagram of an example environment 100 in which systems and/or methods described herein may be implemented. As illustrated, environment 100 may include a mobile terminal 110 with a smart card 115 and/or a storage device 117, a bootstrapping server function (BSF) server 120, a network application function (NAF) server 130, a home subscriber server (HSS) 140, a key server 150, a carrier Trusted Service Manager (TSM) 160, and/or a third party TSM 170 interconnected by a network 180. Components of environment 100 may interconnect via wired and/or wireless connections. A single mobile terminal 110, smart card 115, storage device 117, BSF 120, NAF 130, HSS 140, key server 150, carrier TSM 160, third party TSM 170, and network 180 have been illustrated in FIG. 1 for simplicity. In practice, there may be more mobile terminals 110, smart cards 115, storage devices 117, BSFs 120, NAFs 130, HSSs 140, carrier TSMs 160, third party TSMs 170, and/or networks 180.

Mobile terminal 110 may communicate (e.g., with BSF 120, NAF 130, HSS 140, key server 150, carrier TSM 160, and/or third party TSM 170) via network 180. Mobile terminal 110 may include a mobile device or a stationary device using a wireless interface. For example, mobile terminal 110 may include a computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a computer (e.g., personal computer, a laptop computer, or a tablet computer), a global positioning system (GPS) device, a content recording device (e.g., a camera, a video camera, etc.), a gaming device, a television set-top-box, etc. In an implementation described herein, mobile terminal 110 may include one or more application clients that may connect to NAF 130 to provide services to a user. Mobile terminal 110 may send a hypertext transfer protocol (HTTP) request to BSF 120 that includes a user identity (e.g., an IP multimedia private identity (IMPI) or a temporary IP multimedia private identity (TMPI)) to perform GBA authentication before accessing an application that requires GBA.

Smart card 115 may include a universal integrated circuit card (UICC) or another type of smart card, which connects locally to mobile terminal 110, such as by insertion of smart card 115 into a slot of mobile terminal 110. Smart card 115 may include an integrated circuit and may facilitate the connection of mobile terminal 110 to network 180. Smart card 115 may include information that identifies a particular subscription to environment 100 (e.g., for a particular subscriber). Smart card 115 may include one or more Subscriber Identity Module (SIMs). A SIM may be associated with a unique identification value that identifies smart card 115 to network 180. In one implementation, smart card 115 may store a portion of information included in a PKCS #15 file.

Storage device 117 may include a non-volatile memory storage device, such as, for example, a secure digital (SD) memory card (e.g., miniSD or microSD card). In one implementation, storage device 117 may store a portion of information included in the PKCS #15 file that is not stored in smart card 115. In another implementation, storage device 117 may be used in situations in which a smart card 115 is not associated with mobile terminal 110. For example, for a legacy mobile terminal 110 or a mobile terminal 110 that is not designed to use a smart card 115, storage device 117 may instead be used to store all necessary information included in the PKCS #15 file.

BSF 120 may include one or more server devices, or other types of computation or communication devices, that gather, process, and/or provide information in a manner described herein. For example, BSF 120 may provide application independent functions for mutual authentication of mobile terminals (e.g., mobile terminal 110) and application servers (e.g., NAF 130) to each other and for "bootstrapping" the exchange of secret session keys afterwards. The bootstrap procedure may be initiated, for example, during initial power-up of mobile terminal 110 or in response to a message from a device in (or connected to) network 180 instructing mobile terminal 110 to begin a bootstrap operation. BSF 120 may communicate with HSS 140 to obtain GBA User Security Settings (GUSS) and a random number (RAND) that is used to calculate an authentication vector. BSF 120 may send the authentication vector and the RAND to mobile terminal 110. BSF 120 may authenticate mobile terminal 110 based on a response from mobile terminal 110, and may provide a Bootstrapping Transaction Identifier (B-TID) and a key lifetime value to mobile terminal 110. Both mobile terminal 110 and BSF 120 may independently derive an actual key, referred to as a Ks_NAF, that may be used to secure communications between mobile terminal 110 and NAF 130.

NAF 130 may include one or more server devices, or other types of computation or communication devices, that gather, process, and/or provide information in a manner described herein. For example, NAF 130 may include an application server to provide applications, data, and/or services to mobile terminal 110. In one example implementation, NAF 130 may be a web server that hosts a website from which mobile terminal 110 can receive applications, data, and/or services. In another example, NAF 130 may be a content delivery server that provides broadcast video streams, Video on Demand (VoD) content, or other multimedia content. In other implementations, NAF 130 may provide location-based services.

HSS 140 may include one or more server devices, or other computation or communication devices that store information about subscribers (e.g., users of mobile terminals 110). For example, HSS 140 may store information associated with a UICC associated with a subscriber, services that the subscriber has requested or been assigned, settings associated with the services, and/or a current location of the mobile terminal of the subscriber. In one implementation, HSS 140 may provide this information to BSF 120.

Key sever 150 may include one or more server devices, or other computation or communication devices that security information associated with mobile terminals 110. Key server 150 may, for example, store a symmetric encryption key corresponding to a key that is securely embedded in mobile terminal 110. The key may be programmed into non-volatile memory of mobile terminal 110 during manufacture of mobile terminal 110. The key may be associated with the International Mobile Equipment Identity (IMEI) value that is assigned to mobile terminal 110. The IMEI of a mobile terminal may be a unique value associated with mobile terminals. The IMEI value may be used to lookup the key, stored by key server 150, for mobile terminal 110. Key server 150 may be used during over-the-air (OTA) activation of mobile terminal 110 and may thus be referred to as an OTA server.

Carrier TSM 160 may include one or more server devices, or other computation or communication devices that store information associated with applications, provided by a carrier of mobile terminal 110, that require GBA. Carrier TSM 160 may use the information to generate a PKCS #15 file, or a portion of/an update to the PKCS #15 file. Carrier TSM 160 may provide the PKCS #15 file, or the portion of/the update to the PKCS #15 file, to mobile terminal 110. Mobile terminal 110 may allow a user to access the applications based on the information received from carrier TSM 160.

Third party TSM 170 may include one or more server devices, or other computation or communication devices that store information associated with applications, provided by a third party, that require GBA. The carrier may authorize the third party to use third party TSM 170 to have access to a domain of the carrier via third party authorization. Third party TSM 170 may use the stored information to generate updates for the PKCS #15 file. Third party TSM 170 may provide the updates for the PKCS #15 file to mobile terminal 110. Mobile terminal 110 may modify, based on the updates, information that is referenced when determining whether to allow a user, of the mobile terminal, to access the third party applications.

Network 180 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless GSM, wireless UMTS, wireless CDMA, etc.), or a combination of networks. In one implementation, network 180 may include a wireless core network and/or one or more other types of networks.

Although FIG. 1 shows example components of environment 100, in other implementations, environment 100 may include fewer components, different components, differently arranged components, or additional components than depicted in FIG. 1. Alternatively, or additionally, one or more components of environment 100 may perform one or more other tasks described as being performed by one or more other components of environment 100.

Figure 2:
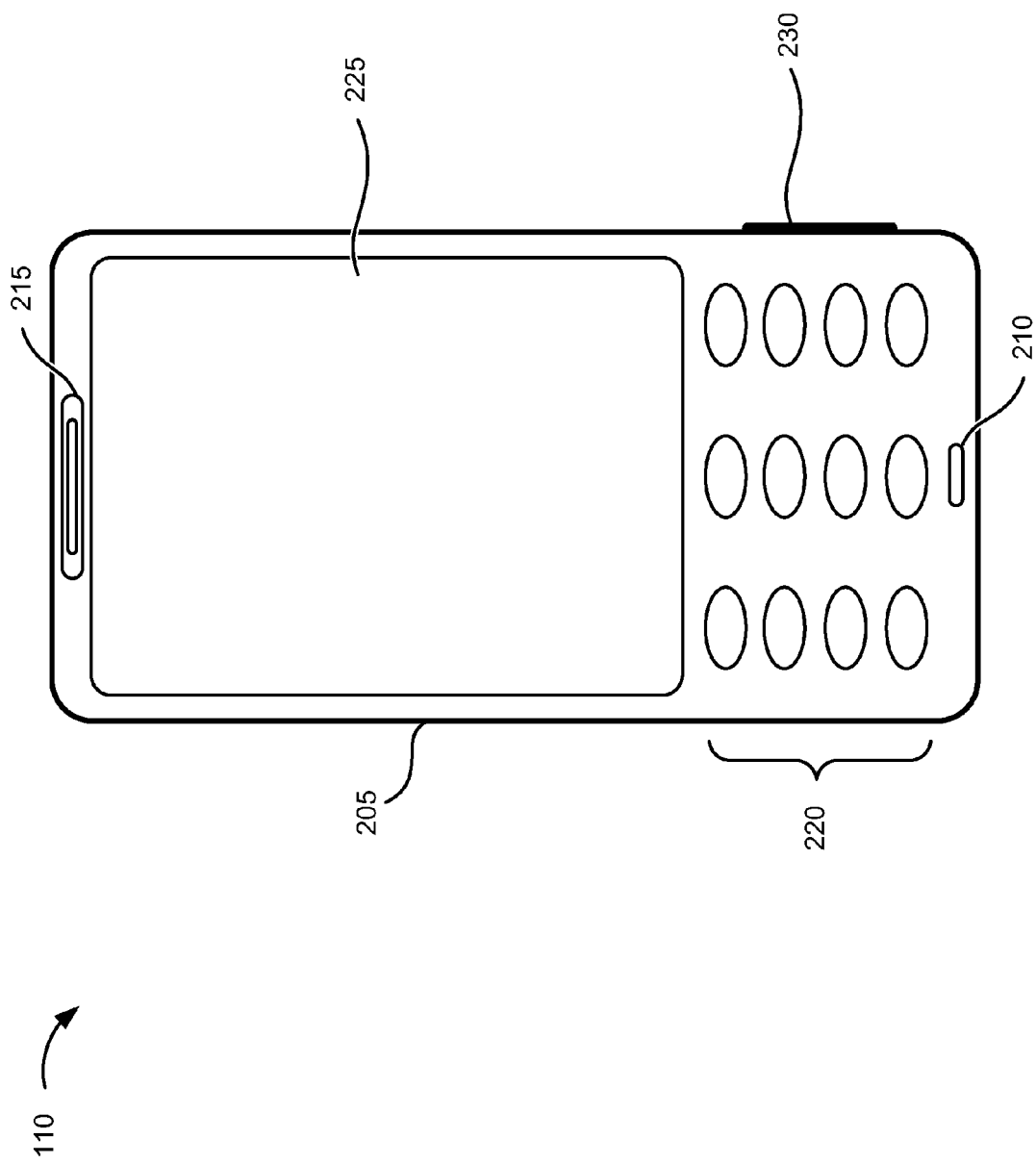
FIG. 2 is a diagram of an example mobile terminal.

FIG. 2 is a diagram of an example mobile terminal 110. As illustrated in FIG. 2, mobile terminal 110 may include a housing 205, a microphone 210, a speaker 215, a keypad 220, a display 225, and a slot 230.

Housing 205 may include a structure to contain components of mobile terminal 110. For example, housing 205 may be formed from plastic, metal, or some other material. Housing 205 may support microphone 210, speakers 215, keypad 220, display 225, and slot 230.

Microphone 210 may include an input device that converts a sound wave to a corresponding electrical signal. For example, the user may speak into microphone 210 during a telephone call or to execute a voice command. Speaker 215 may include an output device that converts an electrical signal to a corresponding sound wave. For example, the user may listen to music, listen to a calling party, or listen to other auditory signals through speaker 215.

Keypad 220 may include an input device that provides input into mobile terminal 110. Keypad 220 may include a standard telephone keypad, a QWERTY keyboard, and/or some other type or arrangement of keys. Keypad 220 may also include one or more special purpose keys. The user may utilize keypad 220 as an input component to mobile terminal 110. For example, the user may use keypad 220 to enter information, such as alphanumeric text, to access data, or to invoke a function or an operation.

Display 225 may include an output device that outputs visual content, and/or may include an input device that receives user input (e.g., a touch screen (also known as a touch display)). Display 225 may be implemented according to a variety of display technologies, such as, a liquid crystal display (LCD), a plasma display panel (PDP), a field emission display (FED), a thin film transistor (TFT) display, or some other type of display technology. Additionally, display 225 may be implemented according to a variety of sensing technologies, such as, capacitive sensing, surface acoustic wave sensing, resistive sensing, optical sensing, pressure sensing, infrared sensing, gesture sensing, etc. Display 225 may display text, images, and/or video to the user. Display 225 may also display a user interface (e.g., a graphical user interface (GUI)) of mobile terminal 110 or a user interface of some other device which mobile terminal 110 controls, a user interface associated with applications, or the like.

Slot 230 may include an opening for smart card 115 to be inserted into mobile terminal 115. Slot 230 may hold smart card 115, and may connect smart card 1150 to one or more other components of mobile terminal 110.

Although FIG. 2 shows example components of mobile terminal 110, in other implementations, mobile terminal 110 may contain fewer components, different components, differently arranged components, or additional components than depicted in FIG. 2. Alternatively, or additionally, one or more components of mobile terminal 110 may perform one or more other tasks described as being performed by one or more other components of mobile terminal 110.

Figure 3:
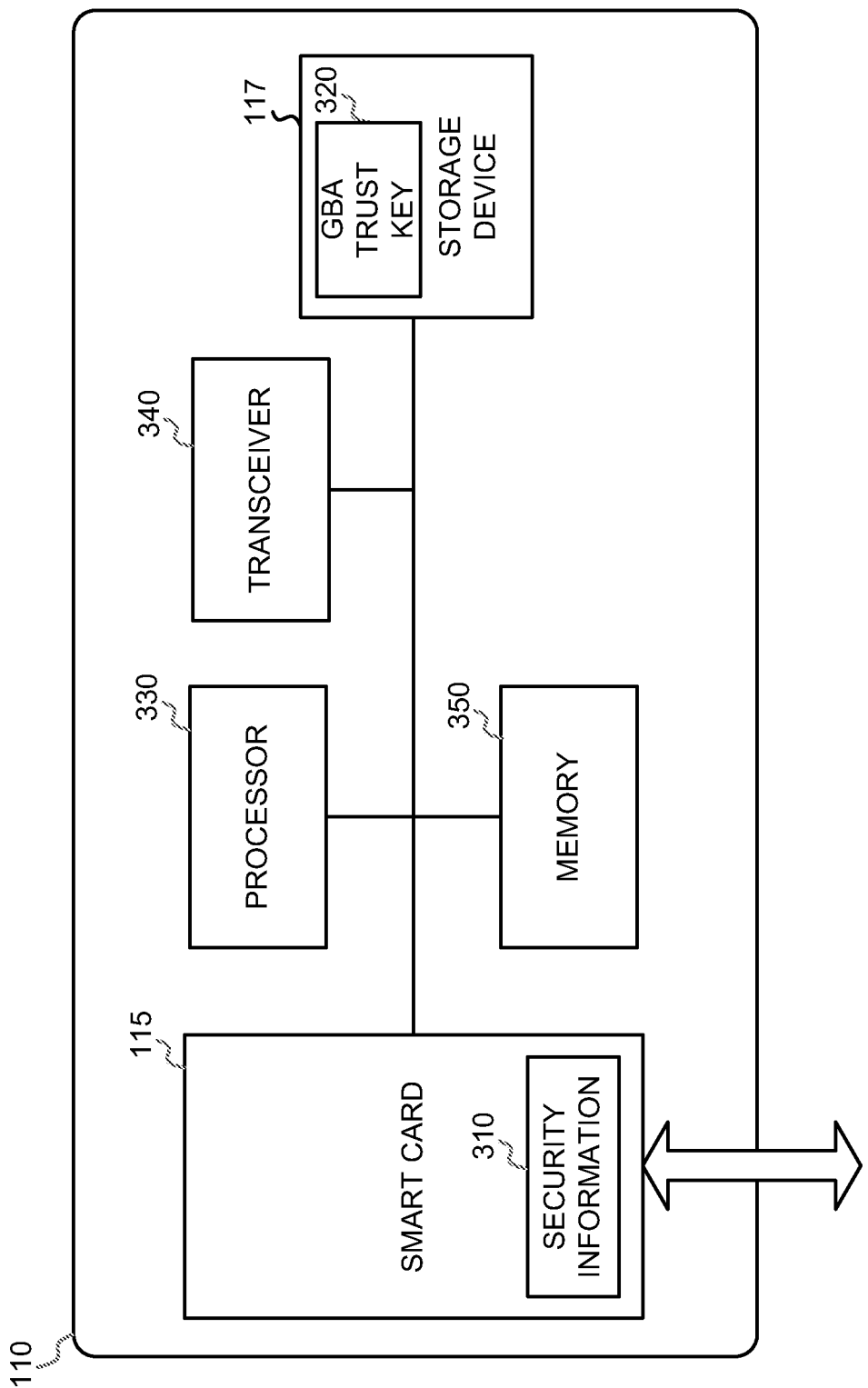
FIG. 3 is a diagram illustrating example components used to implement the mobile terminal shown in FIG. 2.

FIG. 3 is a diagram illustrating example components used to implement mobile terminal 110. Mobile terminal 110 may include smart card 115, storage device 117, a processor 330, a transceiver 340, and a memory 350. Storage device 117 may store a generic bootstrapping architecture (GBA) trust key 320.

As described above, smart card 115 may include a removable memory and/or a processing device that may be used to customize mobile terminal 110. Smart card 115 may securely store personal data that the user enters or downloads to mobile device 110. Smart card 115 may additionally store configuration information for mobile device 110, such as the phone number of the mobile device, message service parameters, hardware identifiers, analog operation parameters, network information, security information, and/or a list of available or subscribed services. Through smart card 115, a subscriber can move their account from one mobile terminal to another by switching the smart card. When used in a GSM or UMTS network, smart card 115 may be referred to as a universal integrated circuit card (UICC). Smart card 115 may be physically inserted into slot 230 included as part of mobile terminal 110.

As shown in FIG. 3, smart card 115 may include security information 310, which may include, for example, encryption keys or other information that may be used to authenticate and/or provide secure communications. Security information 310 may be included in smart card 115 during, for example, manufacture of smart card 115 or stored in smart card 115 at some other time (e.g., during initial provisioning of smart card 115). From the viewpoint of the network operator, smart card 115 may be considered to be a secure, trusted device, which may be verified through security information 310.

In situations in which mobile terminal 110 is implemented without smart card 115, storage device 117 may be used to hold security information 310. The security information in storage device 117 may function similarly to security information 310, as stored by smart card 115.

As described above, storage device 117 may store GBA trust key 320. GBA trust key 320 may include security information, such as a symmetric key, that is stored in non-volatile memory of mobile terminal 110. GBA trust key 320 may include, for example, a 128-bit, device-specific, random number that is programmed into mobile terminal 110 during manufacture of mobile terminal 110. GBA trust key 320 may be used to authenticate mobile terminal 110 to smart card 115 and/or network 180, and to secure communications between mobile terminal 110 and smart card 115.

Processor 330 may include a processor, a microprocessor, or processing logic (e.g., an application specific integrated circuit (ASIC) or a field programmable gate array (FPGA)) that may interpret and execute instructions, such as instructions stored in a computer-readable medium (e.g., memory 350). Transceiver 340 may wirelessly send and receive data to network 180, and may wirelessly receive data from network 180. Transceiver 340 may include, for example, an antenna, a transmitter, and a receiver.

Memory 350 may include a random access memory (RAM) or another type of dynamic or non-volatile storage device that may store data and instructions for execution by processor 330.

Mobile terminal 110 may perform certain operations described herein. Mobile terminal 110 may perform these operations in response to processor 330 executing software instructions (e.g., computer program(s)) contained in a computer-readable medium, such as memory 350, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 350 from another computer-readable medium or from another device. The software instructions contained in memory 350 may cause processor 330 to perform processes described herein. Alternatively, hardwired circuitry may be used in place of or in combination with software instructions to implement processes described herein. Thus, implementations described herein are not limited to any specific combination of hardware circuitry and software.

Although FIG. 3 illustrates example components of mobile terminal 110, in other implementations, mobile terminal 110 may include additional components, fewer components, different components, or differently arranged components than those illustrated in FIG. 3 and described herein. Moreover, one or more components shown in FIG. 3 may perform one or more tasks described herein as being performed by another component of FIG. 3.

Figure 4:
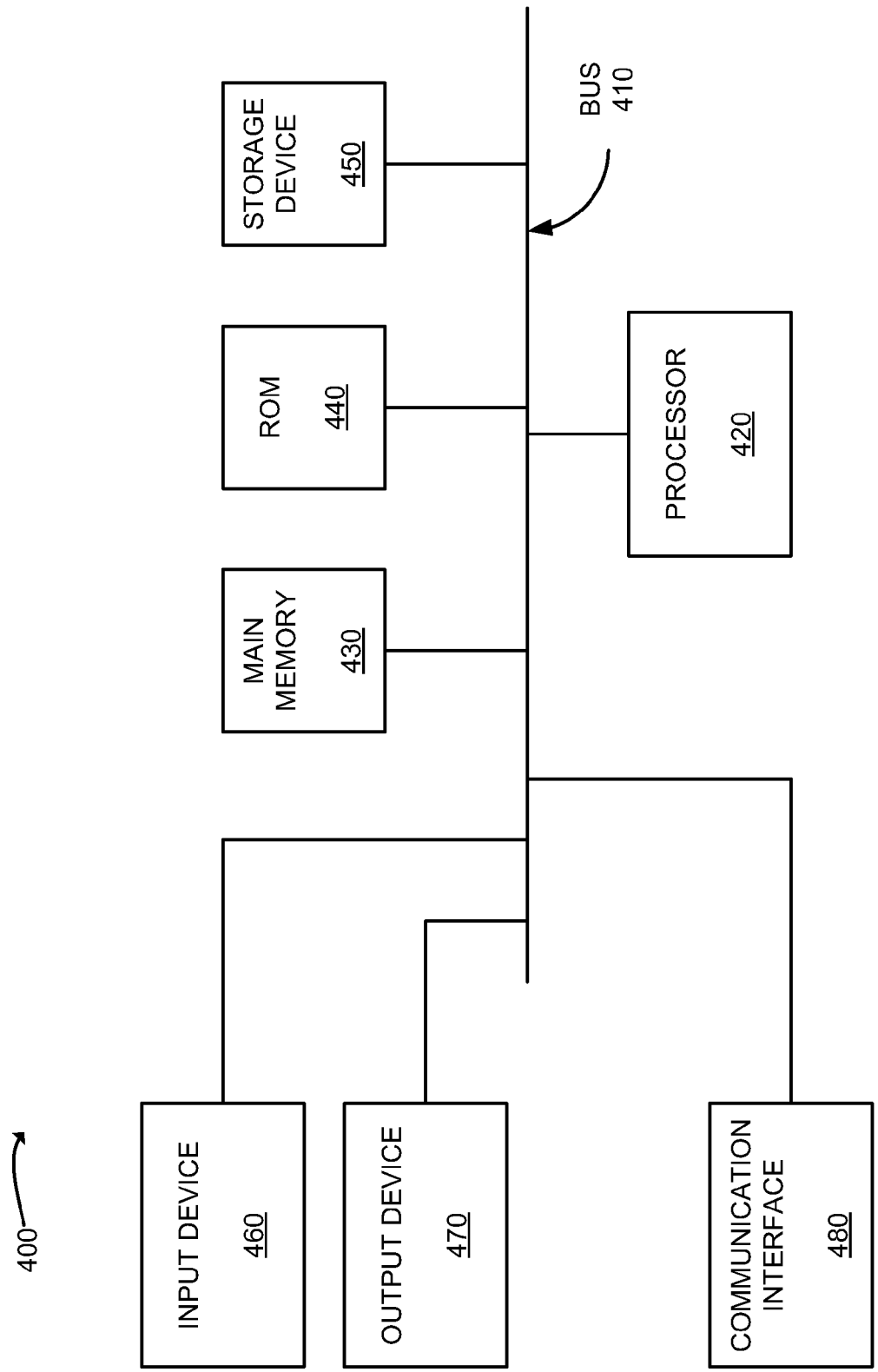
FIG. 4 is a diagram of example components of a network device shown in FIG. 1.

FIG. 4 is a diagram of example components of a network device 400, which may correspond to BSF 120, NAF 130, HSS 140, key server 150, carrier TSM 160, and/or third party TSM 170. As shown in FIG. 4, device 400 may include a bus 410, a processor 420, a main memory 430, a read only memory (ROM) 440, a storage device 450, an input device 460, an output device 470, and a communication interface 480.

Bus 410 may include a path that permits communication among the components of device 400. Processor 420 may include a processor, a microprocessor, or processing logic (e.g., an application specific integrated circuit (ASIC) or a field programmable gate array (FPGA)) that may interpret and execute instructions, such as instructions stored in a computer-readable medium (e.g., memory 430, ROM 440, storage device 450). Main memory 430 may include a random access memory (RAM) or another type of dynamic storage device that may store information and instructions for execution by processor 420. ROM 440 may include a ROM device or another type of static storage device that may store static information and instructions for use by processor 420. Storage device 450 may include a magnetic and/or optical recording medium and its corresponding drive, or a removable form of memory, such as a flash memory.

Input device 460 may include a mechanism that permits an operator to input information to device 400, such as a keyboard, a mouse, a button, a pen, a touch screen, voice recognition and/or biometric mechanisms, etc. Output device 470 may include a mechanism that outputs information to the operator, including a display, a light emitting diode (LED), a speaker, etc. Communication interface 480 may include any transceiver-like mechanism that enables device 400 to communicate with other devices and/or systems. For example, communication interface 480 may include mechanisms for communicating with a component in environment 100.

Although FIG. 4 illustrates example components of device 400, in other implementations, device 400 may include additional components, fewer components, different components, or differently arranged components than those illustrated in FIG. 4 and described herein. Moreover, one or more components shown in FIG. 4 may perform one or more tasks described herein as being performed by another component of FIG. 4.

Figure 5:
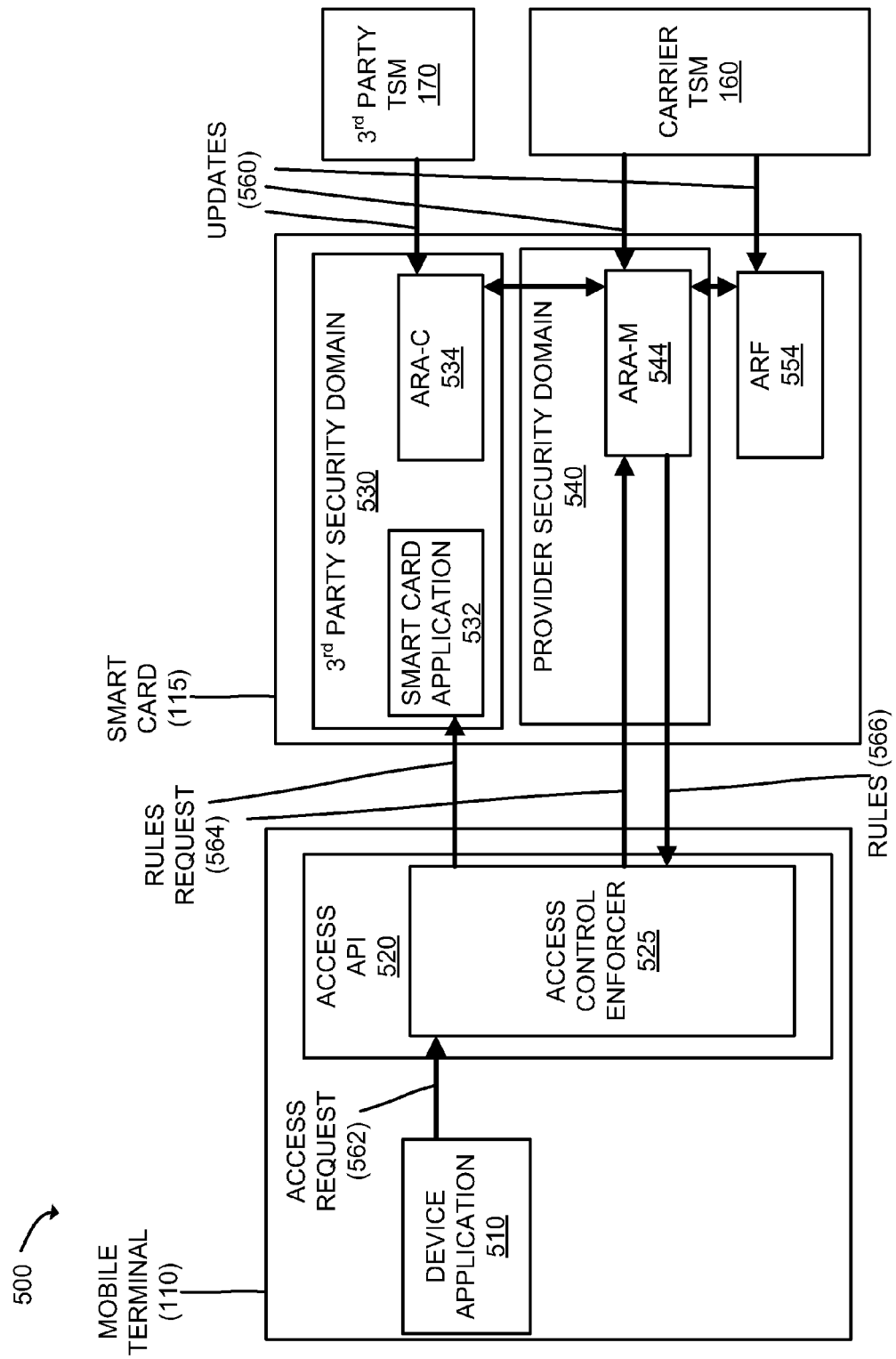
FIG. 5 is a diagram of example functional components of an example portion of the environment in FIG. 1 and operations capable of being performed by the example portion.

FIG. 5 is a diagram of example functional components of portion 500 of environment 100 and operations capable of being performed by portion 500. As shown in FIG. 5, portion 500 may include mobile terminal 110, smart card 115, carrier TSM 160, and/or third party TSM 170.

As further shown in FIG. 5, mobile terminal 110 may include a device application 510 and an access application program interface (API) 520. A user of mobile terminal 110 may use mobile terminal 110 to invoke a service provided via device application 510. A carrier of mobile terminal 110 may require bootstrapping for device application 510. Access API 520 may include an access control enforcer 525. Access control enforcer 525 may determine whether the user is allowed to access and/or use various functionalities of device application 510.

Smart card 115 may include a third party security domain 530, which includes a smart card application 532 and an access rule application client (ARA-C) 534; a provider security domain 540, which includes an access rule application master (ARA-M) 544; and access rule files (ARF) 554. Smart card 115 may store information from a PKCS #15 file in ARA-C 534, ARA-M 544, and/or ARF 554.

In one implementation, smart card 115 may receive updates 560 to the PKCS #15 file from carrier TSM 160 and/or third party TSM 170. Smart card 115 may modify PKCS #15 information stored in ARA-C 534, ARA-M 544, and/or ARF 554 based on updates 560.

A user may invoke device application 510 by, for example, selecting an icon that corresponds to device application 510. In response, device application 510 may transmit an access request 562 to access API 520. As described in further detail below, access API 520 may request authorization to determine whether to allow the user to access/use device application 510. Access API 520 may receive the authorization when mobile device terminal 110 can perform bootstrapping.

In one example, when API 520 receives the authorization, access control enforcer 525 may transmit a rules request 564, for device application 510, to smart card application 532. In response to rules request 564, smart card application 532 may, for example, direct ARA-M 544 to provide rules 566, which are applicable to device application 510, to access control enforcer 525. In another example, when API 520 receives the authorization, access control enforcer 525 may transmit rules request 564 to ARA-M 544. ARA-M 544 may retrieve rules 566, which are applicable to device application 510, and may transmit rules 566 to access control enforcer 525. Access control enforcer 525 may determine whether to allow the user to access/use device application 510, and/or functionalities of device application 510, based on rules 566.

Although FIG. 5 shows example functional components of portion 500, in other implementations, portion 500 may include fewer functional components, different functional components, and/or additional functional components than depicted in FIG. 5. Alternatively, or additionally, one or more components of portion 500 may perform one or more tasks described as being performed by one or more other components of portion 500.

Figure 6:
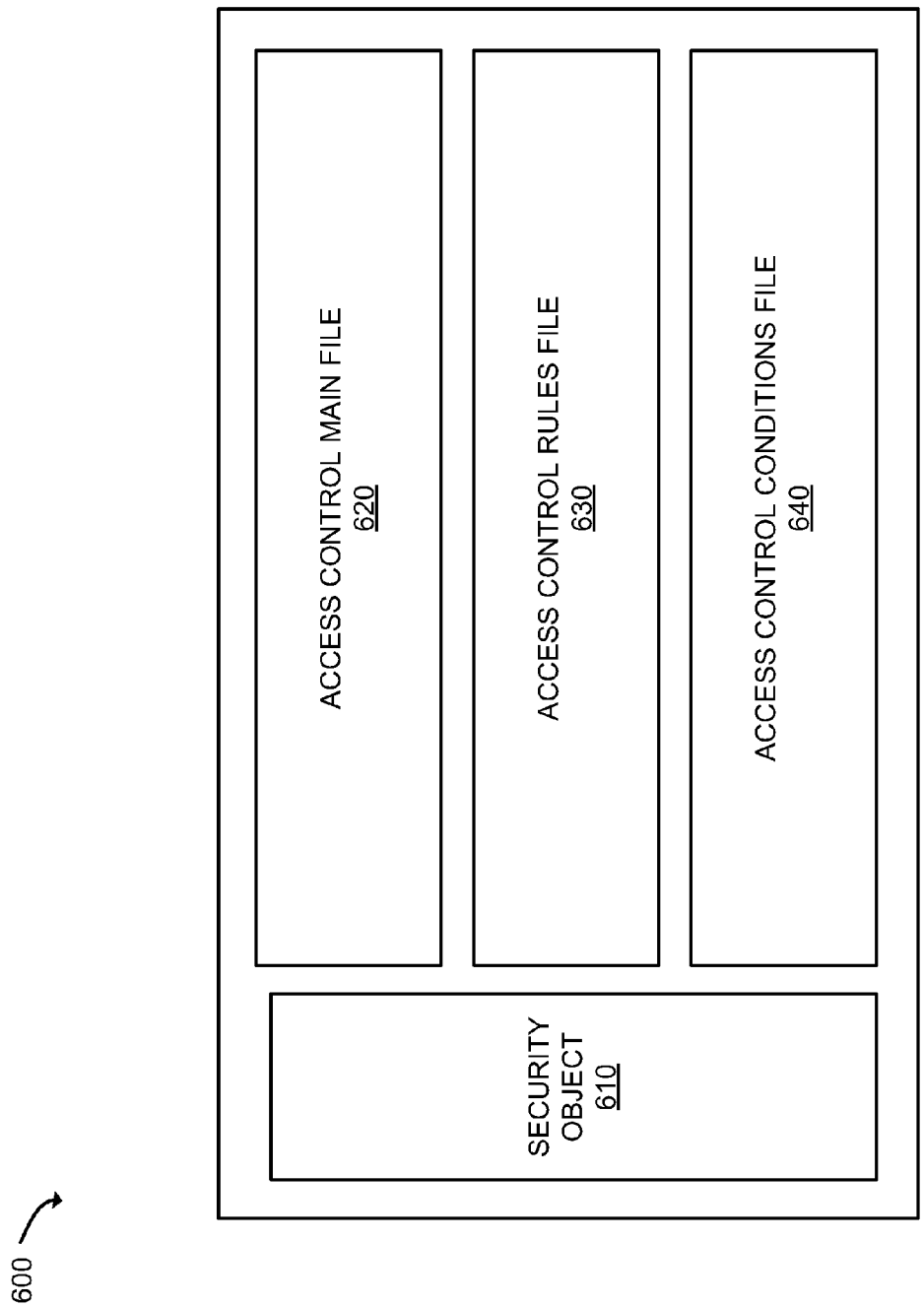
FIG. 6 is a diagram of an example portion of a Public Key Cryptography Standard (PKCS) #15 file structure.

FIG. 6 is a diagram of an example portion 600 of a PKCS #15 file structure. As shown in FIG. 6, example portion 600 may include a security object 610, an access control main file 620, an access control rules file 630, and an access control conditions file 640.

Security object 610 may include information that can be used to determine whether a user of mobile terminal 110 is allowed to access and/or use device application 510 via mobile terminal 110. In one implementation, security object 610 may include biometric information that may be used to verify an identity of the user before a secure channel is established for an application invoked by the user. In another implementation, security object 610 may include secure elements, certificates, public and private keys, personal identification numbers (PINs), and/or other information that is required to establish the secure channel.

Mobile terminal 110 may perform bootstrapping, by using GBA, to establish the secure channel. For example, bootstrapping may refer to mobile terminal 110 and a network device (e.g., BSF 120) agreeing on a session key to be used for an encrypted data exchange with another network device (e.g., NAF 130). In this manner, the secure channel may be established between mobile terminal 110 and the other network device. Mobile terminal 110 may use the secure channel to access, via network 180, services and/or data that are required by device application 510.

Access control main file 620 may include a path to access control rules files 630. In one implementation, access control main file 620 may specify that access control rules files 630 includes rules associated with applications that require bootstrapping.

Access control rules file 630 may store one or more rules that are associated with one or more applications that require bootstrapping. In one implementation, access control rules file 630 may further specify which rule(s) apply to which application(s). Each one of the rules may be for one or more of the applications. The rules may specify applications that the user of mobile terminal 110 may access and functionalities of the applications that the user may access/use. In another implementation, access control rules file 630 may include path(s) to conditions in access control conditions file 640. Access control rules file 630 may specify which one or more of the conditions are applicable based on which rules are applied. Mobile terminal 110 may apply rules, of access control rules file 630, to determine whether the user of mobile terminal 110 may access a particular application and/or a particular functionality of the particular application.

Access control conditions file 640 may store conditions that are to be satisfied before access is provided to applications. One of the conditions may specify that bootstrapping is required for the application.

Security object 610 may be stored in mobile terminal 110. Information from access control main file 620, access control rules file 630, and/or access control conditions file 640 may be stored in ARA-C 534, ARA-M 544, and/or ARF 554.

Additionally, or alternatively, one or more of security object 610, access control main file 620, access control rules file 640, and/or access control conditions file 640 may include one or more types of information required for bootstrapping. In one example implementation, security object 610 may include, for example, bootstrapping identifiers, which mobile terminal 110 may use to perform the bootstrapping required by the application. In another example implementation, only access control main file 620 may include information required to perform bootstrapping. The bootstrapping information may be stored in one or more of ARA-C 534, ARA-M 544, ARF 554, and/or in one or more other components of mobile terminal 110 and/or smart card 115.

Figure 7:
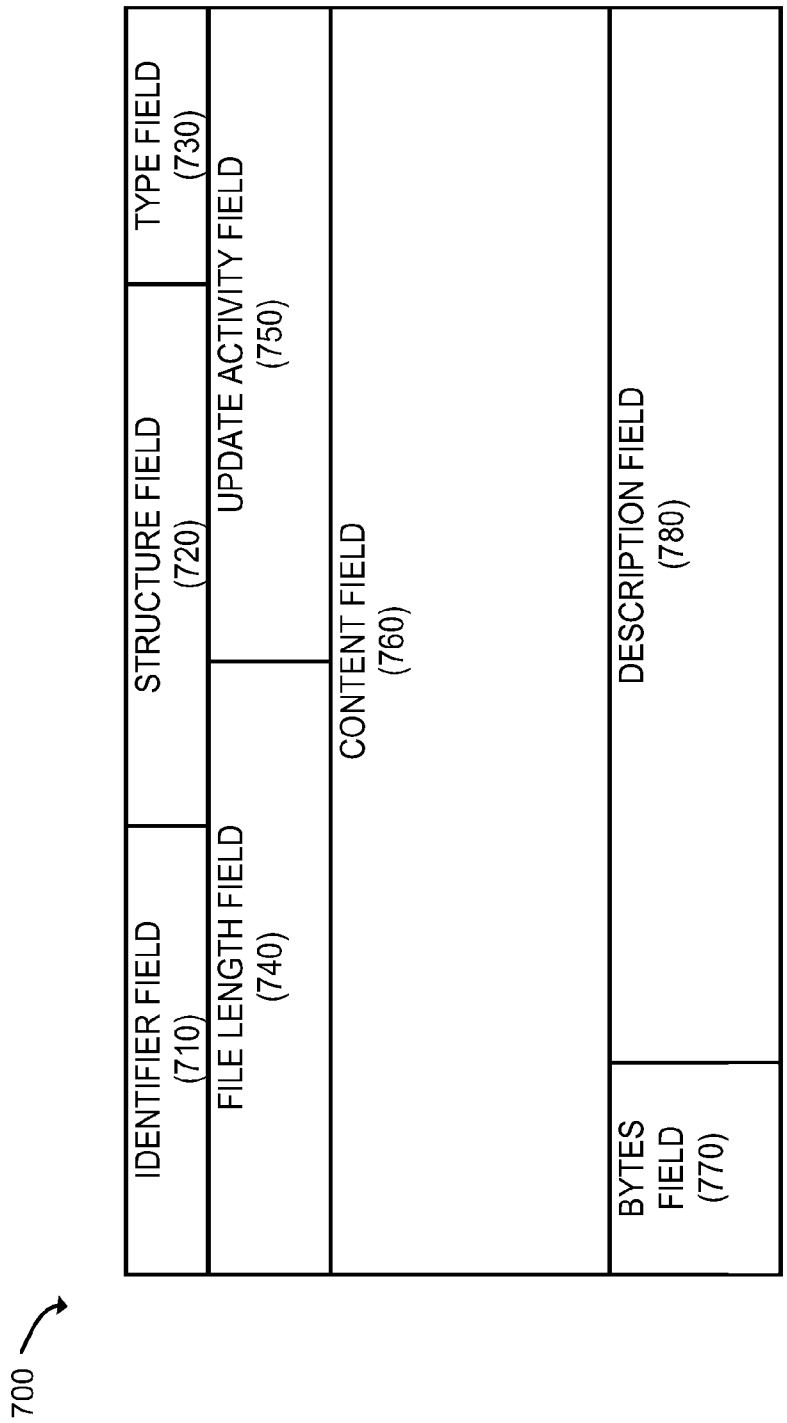
FIG. 7 is a diagram of example fields of a file shown in FIG. 6.

FIG. 7 is a diagram of example fields of a file structure 700. File structure 700 may be used for one or more of access control main file 620, access control rules file 630, or access control conditions file 640. As shown in FIG. 7, file structure 700 may include an identifier field 710, a structure field 720, a type field 730, a file length field 740, an update activity field 750, a content field 760, a bytes field 770, and/or a description field 780. Although FIG. 7 shows example fields of file structure 700, in other implementations, file structure 700 may include fewer fields, different fields, and/or additional fields than depicted in FIG. 7.

Identifier field 710 may uniquely identify a file represented by file structure 700. Structure field 720 may specify a type of structure used for the file. In one example, structure field 720 may specify that the file has a transparent file structure (e.g., the file is a string that can be accessed at any desired location of the string). Type field 730 may specify a type of information included in the file. For example, when file structure 700 is used for access control rules file 630, type field 730 may include a "mandatory" indicator that specifies that access control enforcer 525 is required to enforce the access rules included in the file at all times.

File length field 740 may specify a size of the file. For example, file length field 740 may include a particular quantity of bytes that represent the size of the file. Update activity field 750 may indicate how often the information in the file is updated based on, for example, updates 560 from third party TSM 170 and/or carrier TSM 160. For example, update activity field 750 may include a "low" indicator that corresponds to a particular period of time that indicates that updates 560 for the file will be received less frequently than a particular average, such as once every 24 hours.

Content field 760 may include information based on which rules are retrieved for access control enforcer 525. In one example, when file structure 700 is used for access control main file 620, content field 760 may include a path to access control rules file 630. In another example, when file structure 700 is used for access control rules file 630, content field 760 may include rules that specify information regarding which type of access, if any, is allowed to the device application 510 by a user of mobile terminal 110. In yet another example, when file structure 700 is used for access control conditions file 640, content field 760 may include conditions that need to be satisfied based on one or more of the rules.

Bytes field 770 may specify a sequence of bytes, such as 1 to n (n≥2), that make up the file represented by file structure 700. Description field 780 may include a description of the information included in content field 760. In one example, when file structure 700 is used for access control main file 620, description field 780 may specify "AccessControlMainFile." In another example, when file structure 700 is used for access control rules file 630, description field 780 may specify "List of Rules." In yet another example, when file structure 700 is used for access control conditions file 640, description field 780 may specify "List of Conditions."

Figure 8:
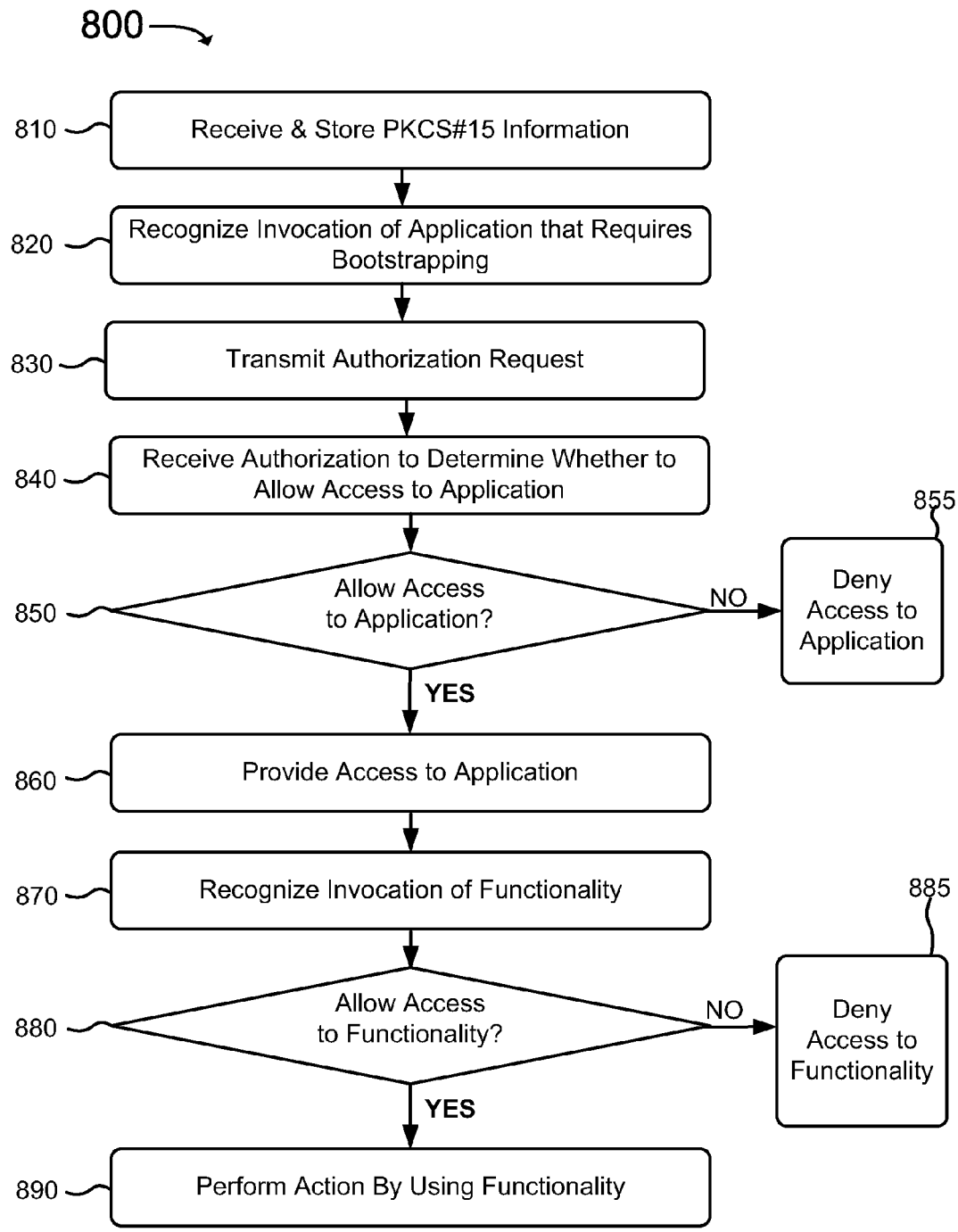
FIG. 8 is a flow chart of an example process for using a PKCS #15 file structure for applications requiring GBA.

FIG. 8 is a flow chart of an example process 800 for using a PKCS #15 file structure for applications requiring GBA. In one implementation, mobile terminal 110 may perform process 800. In another implementation, a device or collection of devices separate from, or in combination with, mobile terminal 110 may perform some or all of process 800.

As shown in FIG. 8, process 800 may include receiving and storing PKCS #15 information (block 810). For example, a user may sign-up for a mobile service plan with a wireless carrier associated with mobile terminal 110. The mobile service plan may allow the user to access/use particular applications that require GBA to be supported by mobile terminal 110 to support GBA. The user may insert smart card 115 into mobile terminal 110 in order to use the mobile service plan. After the user inserts smart card 115, mobile terminal 110 may receive PKCS #15 information, such as a PKCS #15 file, from one or more servers (e.g., key server 150 and carrier TSM 160) of the carrier. In one example implementation, mobile terminal 110 may download the PKCS #15 information as part of OTA activation of mobile terminal 110.

Mobile terminal 110 may store the PKCS #15 information in storage device 117 and/or smart card 115. As described above with respect to FIG. 6, The PKCS #15 information may include rules and/or conditions associated with accessing and/or using the particular applications that require bootstrapping and/or information necessary for bootstrapping. Thereafter, mobile terminal 110 may receive updates 560 to the PKCS #15 information, as described above with reference to FIG. 5. Mobile terminal 110 may update the PKCS #15 information, stored in storage device 117 and/or smart card 115, based on updates 560.

Process 800 may further include recognizing an invocation of an application that requires bootstrapping (block 820). For example, a user may select an icon, displayed on a user interface of mobile terminal 110, in order to access/use an application that requires bootstrapping. Mobile terminal 110 may detect a signal (e.g., access request 562 of FIG. 5) in response to the user selecting the icon. Mobile terminal 110 may recognize an invocation of the application based on the signal.

Process 800 may also include transmitting an authorization request (block 830). For example, access control enforcer 525, of mobile terminal 110, may determine that authorization (e.g., a security relationship) is required before mobile terminal 110 may determine whether to provide access to the application. Access control enforcer 525 may generate an authorization request to receive the authorization. The authorization request may include a request for a service associated with the application. Mobile terminal 110 may transmit the authorization request to NAF 130.

NAF 130 may determine that the requested service requires a secure channel, and may transmit an authentication request to BSF 120 in order to establish the secure channel. The authorization request and the authentication request may include a B-TID associated with mobile terminal 110, and/or smart card 115, and/or information associated with the application. BSF 120 may determine that bootstrapping is required for the application based on the authentication request that identifies the application. BSF 120 may further determine, based on a profile associated with mobile terminal 110, that mobile terminal 110 is authorized to determine whether to allow the user to access the application and/or that mobile terminal 110 supports bootstrapping. In response, BSF 120 may create a session for the secure channel by using GBA. BSF 120 may transmit an authentication answer to NAF 130 that includes bootstrap information (e.g., Ks_NAF, an application specific dataset, an application specific part of a profile associated with mobile terminal 110 and/or smart card 115, etc.) required to establish the secure channel.

Process 800 may also include receiving an authorization to determine whether to allow access to the application (block 840). For example, NAF 130 may store the bootstrap information, may generate an application answer based on the bootstrap information, and may transmit the application answer to mobile terminal 110. Mobile terminal 110 may receive the application answer from NAF 130, and the secure channel may be established between NAF 130 and mobile terminal 110. The authentication answer may include an authorization to determine whether to allow access to the application. In one implementation, mobile terminal 110 may only receive the authorization when mobile terminal 110 supports bootstrapping and/or when NAF 130 determines that mobile terminal 110 is authorized to determine whether to allow access to the application.

Process 800 may also include determining whether to allow access to the application (block 850). For example, mobile terminal 110 may retrieve rules to determine whether to allow the user to access the application via mobile terminal 110. In one example, access control enforcer 525, or another component of mobile terminal 110, may transmit a request for the rules (e.g., rules request 564) to smart card 115. In response to the request, smart card 115 may retrieve the rules, conditions, and/or other information (e.g., rules 566) that was received as part of the PKCS #15 information for the application that requires bootstrapping. Smart card 115 may forward the rules, the conditions, and/or the other information to access control enforcer 525. Access control enforcer 525 may identify an access rule, of the rules, and/or one or more conditions, of the conditions, associated with the access rule. Access control enforcer 525 may determine whether the user is allowed to access the application based on the access rule and/or the one or more conditions.

For example, a particular rule may indicate that the user of mobile terminal 110 is allowed to access the application if a particular condition is satisfied. The particular condition may indicate that mobile terminal 110 needs to support bootstrapping for the particular conditions to be satisfied.

Mobile terminal 110 may determine that bootstrapping is required for the application based on the particular condition. In one implementation, mobile terminal 110 may determine that mobile terminal 110 supports bootstrapping based on (e.g., after receiving) the authorization. In another implementation, mobile terminal 110 may determine that mobile terminal 110 supports bootstrapping based on information included in a security object (e.g., security object 610 of FIG. 6) of the PKCS #15 information.

If the user is not allowed to access the application (block 850—NO), process 800 may include denying access to the application (block 855). For example, access control enforcer 525 may determine that the user is not allowed to access the application when the access rule indicates that the user of mobile terminal 110 is not allowed to access the application or when one or more of the identified conditions are not satisfied. When access control enforcer 525 determines that the user is not allowed to access the application, access control enforcer 525 may prompt mobile terminal 110 to inform the user that access to the application is denied. In one example, mobile terminal 110 may inform the user by displaying a message that indicates that the user cannot access the application via mobile terminal 110.

If the user is allowed to access the application (block 850—YES), process 800 may include providing access to the application (block 860). For example, access control enforcer 525 may determine that the user is allowed to access the application when the access rule indicates that the user of mobile terminal 110 is allowed to access the application and the identified conditions are satisfied. When access control enforcer 525 determines that the user is allowed to access the application, access control enforcer 525 may prompt mobile terminal 110 to, for example, display a user interface associated with the application. The user may access the application via the user interface.

Process 800 may also include recognizing an invocation of a functionality (block 870) and determining whether to allow access to the functionality (block 880). For example, a user may select a portion of the user interface of the application to enter a command. Mobile terminal 110 may recognize that a particular functionality of the application is invoked when the command is entered. In one implementation, mobile terminal 110 may identify previously received rules and/or conditions that are associated with the functionality. Mobile terminal 110 may determine whether to allow the user to access the functionality of the application via mobile terminal 110 based on the identified rules and/or conditions. In another implementation, access control enforcer 525 may retrieve, from smart card 115, rules and/or conditions associated with the functionality after recognizing the invocation of the functionality. Mobile terminal 110 may determine whether to allow the user to access the functionality of the application via mobile terminal 110 based on the retrieved rules and/or conditions.

If the user is not allowed to access the functionality (block 880—NO), process 800 may include denying access to the functionality (block 885). For example, access control enforcer 525 may determine that the user is not allowed to access the functionality when the applicable rule indicates that the user of mobile terminal 110 is not allowed to access the functionality or when one or more conditions, associated with the applicable rule, are not satisfied. When access control enforcer 525 determines that the user is not allowed to access the functionality, access control enforcer 525 may prompt mobile terminal 110 to inform the user that access to the functionality is denied. In one example, mobile terminal 110 may inform the user by displaying a message that indicates that the command entered by the user cannot be performed because the user cannot access the functionality.

If the user is allowed to access the functionality (block 880—YES), process 800 may include performing an action by using the functionality (block 890). For example, access control enforcer 525 may determine that the user is allowed to access the functionality when the applicable rule indicates that the user of mobile terminal 110 is allowed to access the functionality. When access control enforcer 525 determines that the user is allowed to access the functionality, access control enforcer 525 may prompt mobile terminal 110 to, for example, perform an action by using the functionality of the application. Mobile terminal 110 may perform the action based on the command entered by the user.

Systems and/or methods, described herein, may allow mobile terminal 110 to determine whether to allow a user to access an application, which requires GBA, by using information from a PKCS #15 file. The PKCS #15 file may include rules related to the application and/or GBA-related information. As a result, the carrier of mobile terminal 110 may ensure that only authorized users access the application via mobile terminals that support GBA.

The foregoing description provides illustration and description, but is not intended to be exhaustive or to limit the embodiments to the precise form disclosed. Modifications and variations are possible in light of the above teachings or may be acquired from practice of the embodiments.

While a series of blocks has been described with regard to FIG. 8, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   storing, by a mobile terminal, information associated with accessing an application that requires bootstrapping;
   recognizing, by the mobile terminal, an invocation of the application;
   identifying, by the mobile terminal, a rule, in the information, associated with accessing the application;
   determining, by the mobile terminal, whether the rule indicates that a user of the mobile terminal is allowed to access the application;
   determining, by the mobile terminal, whether the mobile terminal supports the bootstrapping; and
   providing, by the mobile terminal, access to the application when the rule indicates that the user of the mobile terminal is allowed to access the application and when the mobile terminal supports the bootstrapping.

2. The method of claim 1,
   where the information is Public Key Cryptography Standard (PKCS) #15 information, and
   where the method further comprises:
      receiving an update for the information from a provider of the application; and
      modifying the stored information based on the update.

3. The method of claim 1,
   where the information comprises a security object,
   where the security object comprises identifiers required for the bootstrapping, and
   where the method further comprises:
      using the identifiers to perform the bootstrapping.

4. The method of claim 1,
   where the information comprises a condition that is satisfied when the mobile terminal supports the bootstrapping, and
   where determining whether the mobile terminal supports the bootstrapping comprises:
      identifying that the condition is associated with the rule, and
      determining that the condition is satisfied by the mobile terminal.

5. The method of claim 1, where the information is stored in at least one of a storage device of the mobile terminal or a smart card of the mobile terminal.

6. The method of claim 1, where identifying the rule associated with accessing the application comprises:
   transmitting, to a server, a request to access the application,
   receiving, as a response to the request, authorization for the mobile terminal to determine whether the user is allowed to access the application, and
   identifying the rule associated with accessing the application after receiving the authorization.

7. The method of claim 1, further comprising:
   recognizing an invocation of a functionality of the application;
   identifying a particular rule, in the information, associated with accessing the functionality;
   determining whether the particular rule indicates that the user of the mobile terminal is allowed to access the functionality; and
   performing an action by using the functionality when the particular rule indicates that the user of the mobile terminal is allowed to access the functionality.

8. The method of claim 7,
   where recognizing the invocation of the functionality of the application comprises:
      receiving a command entered by the user,
   where the command requires the functionality, and
   where performing the action by using the functionality comprises:
      performing the action based on the command.

9. A mobile terminal comprising:
a storage device to store information associated with an application that requires bootstrapping by the mobile terminal; and
a processor to:
receive a request to use the application,
identify, in the information, a rule associated with using the application,
determine whether the rule indicates that a user of the mobile terminal is allowed to use the application,
determine whether the mobile terminal supports a generic bootstrapping architecture (GBA) used for the bootstrapping, and
allow the user to use the application when the rule indicates that the user of the mobile terminal is allowed to access the application and when the mobile terminal supports the GBA.

10. The mobile terminal of claim 9, where the processor is further to:
receive a Public Key Cryptography Standard (PKCS) #15 file,
retrieve the information from the PKCS #15 file, and
store the information in the storage device.

11. The mobile terminal of claim 9, where the processor is further to:
recognize an invocation of a functionality of the application;
identify a particular rule, in the information, associated with accessing the functionality;
determine whether the particular rule indicates that the user of the mobile terminal is allowed to access the functionality; and
perform an action by using the functionality when the particular rule indicates that the user of the mobile terminal is allowed to access the functionality.

12. The mobile terminal of claim 11,
where, when recognizing the invocation of the functionality of the application, the processor is to:
receive a command entered by the user,
where the command requires the functionality, and
where, when performing the action by using the functionality, the processor is to:
perform the action based on the command.

13. The mobile terminal of claim 9,
where the information comprises a security object, and
where the security object comprises identifiers required for the bootstrapping.

14. The mobile terminal of claim 9,
where the information comprises a condition that is satisfied when the mobile terminal supports the GBA, and
where, when determining whether the mobile terminal supports the GBA, the processor is to:
identify that the condition is associated with the rule, and
determine that the condition is satisfied by the mobile terminal.

15. The mobile terminal of claim 9, where the processor is further to:
transmit, to a server, an authorization request for the application, and
receive, from the server and when the server determines that the mobile terminal is authorized to determine whether to allow the user to access the application, authorization for the mobile terminal to determine whether the user is allowed to use the application.

16. One or more non-transitory computer-readable media for storing instructions, the instructions comprising:
one or more instructions, which when executed by one or more processors of a mobile terminal, cause the one or more processors to receive a Public Key Cryptography Standard (PKCS) #15 file;
one or more instructions, which when executed by the one or more processors of the mobile terminal, cause the one or more processors to store information included in the PKCS #15 file in at least one of a storage device or a smart card of the mobile terminal;
one or more instructions, which when executed by the one or more processors of the mobile terminal, cause the one or more processors to recognize an invocation of an application that requires bootstrapping;
one or more instructions, which when executed by the one or more processors of the mobile terminal, cause the one or more processors to retrieve a rule, included in the information, associated with accessing the application;
one or more instructions, which when executed by the one or more processors of the mobile terminal, cause the one or more processors to determine whether the rule indicates that a user of the mobile terminal is allowed to access the application;
one or more instructions, which when executed by the one or more processors of the mobile terminal, cause the one or more processors to determine whether the mobile terminal supports the bootstrapping; and
one or more instructions, which when executed by the one or more processors of the mobile terminal, cause the one or more processors to provide access to the application when the rule indicates that the user of the mobile terminal is allowed to access the application and when the mobile terminal supports the bootstrapping.

17. The media of claim 16, where the one or more instructions to determine whether the mobile terminal supports the bootstrapping comprise:
one or more instructions to transmit a request to access the application to a server,
one or more instructions to receive authorization for the mobile terminal to determine whether the user is allowed to access the application, and
one or more instructions to determine that the mobile terminal supports the bootstrapping based on the authorization.

18. The media of claim 16, where the instructions further comprise:
one or more instructions to recognize an invocation of a functionality of the application;
one or more instructions to identify a particular rule, included in the information, associated with accessing the functionality;
one or more instructions to determine whether the particular rule indicates that the user of the mobile terminal is allowed to access the functionality; and
one or more instructions to perform an action by using the functionality when the particular rule indicates that the user of the mobile terminal is allowed to access the functionality.

19. The media of claim 18,
where the one or more instructions to provide the access to the application comprise:
one or more instructions to display a user interface associated with the application, and
where the one or more instructions to recognize the invocation of the functionality comprise:

one or more instructions to receive a selection of a portion of the user interface associated with the functionality, and where the one or more instructions to perform the action by using the functionality, the processor is to:
perform the action based on the selection.

20. The media of claim 18,
where the information comprises a security object,
where the security object comprises identifiers required for the bootstrapping, and
where the instructions further comprise:
one or more instructions to perform the bootstrapping based on the identifiers before providing the access to the application.

* * * * *